Patented Dec. 10, 1946

2,412,216

UNITED STATES PATENT OFFICE 2,412,216

RUBBERLIKE COMPOSITION

Mortimer T. Harvey, East Orange, N. J., assignor to Harvel Research Corporation, a corporation of New Jersey No Drawing. Application August 9, 1940, Serial No. 351,964

2 Claims. (Cl. 260—36)

The present invention relates to compositions of matter in which artificial rubber of the "Buna" or polymerized butadiene type and vinyl (or vinylidene) polymers are in compatible mixtures or solutions, and the present invention relates to methods and steps for preparing and using the compositions of the present invention.

The essential ingredients of the compositions of the present invention, (1) artificial rubbers of the "Buna" type and (2) a vinyl polymer are brought together by (3) a mutual solvent or mutually compatible vehicle for the "Buna" and the vinyl polymer, illustrative examples of such mutual solvent or vehicle being tricresyl phosphate and products of condensation of formaldehyde with a tertiary alcohol or an unsaturated hydrocarbon or oxy-hydrocarbon. Particular, illustrative examples of products of condensation of formaldehyde with a tertiary alcohol or unsaturated organic compounds will be described hereinafter. The mutual solvent or mutually compatible vehicle can be considered as a material which is adapted to lower the viscosity of one or both of the said essential ingredients to the point where the two said essential ingredients become compatible or dissolved in one another.

An object of the present invention is to provide a method and material for making a composition with that "artificial rubber" known on the market by such names as "Buna" or "Perbunan" whereby an artificial rubber compound is produced which has certain physical and chemical characteristics which are deficient or entirely lacking in "Buna" itself.

The compositions of the present invention can be used either with or without real rubber therein for various uses to which natural rubber is put and for other new uses for which real rubber is not suited.

Various objects and advantages of the present invention will be pointed out and will be apparent from the following description of the products of the present invention and of methods and steps of making and using said products.

The term "Buna" as used herein is intended to mean certain synthetic materials made from butadiene, with or without other materials, by polymerization or copolymerization, to produce artificial rubber materials known as and sold under the names of "Buna," "Buna S," and "Perbunan" ("Buna N"). "Buna" is a straight butadiene polymer; "Buna S" is a copolymer of butadiene and styrene; and "Perbunan ("Buna N") is a copolymer of butadiene and acrylonitrile; and the term "Buna" as used herein is intended to cover also other butadiene polymers and copolymers of the "Buna" type including products obtained by various polymerization methods and steps and products obtained by copolymerizing various proportions of materials such as various proportions of styrene and butadiene or of acrylonitrile and butadiene and products obtained by copolymerizing other or different materials with butadiene such as copolymerizing both styrene and acrylonitrile with butadiene and copolymerizing coumarone or indene with butadiene and to cover generally artificial rubbers which are butadiene polymers or copolymers.

The term polyvinyl ester is used to designate polymers of vinyl esters such as polymerized vinyl chloride, polymerized vinyl acetate, copolymers of vinyl chloride and vinyl acetate, polymerized vinyl chloroacetate and other polymerized vinyl esters and copolymers. These range in consistency from the liquid state to solid resin-like products depending on the material and on the degree or extent to which they are polymerized and are used in the practice of the present invention in their various states according to the use to which they are to be used and to the suitability of their consistency to the method of handling required in putting them to use.

The mutual solvent or mutually compatible vehicle for the "Buna" and the polyvinyl ester of the present invention is a material which will serve to make the "Buna" and the polyvinyl ester compatible with each other and bring them together into a workable composition and at the same time will not act deleteriously when the composition is handled and worked up into more advanced and final states (as, for example by vulcanization through heating) but will either remain a part of the final composition either in its original form or in some intermediate or final form or will evaporate from the composition at some stage after bringing the "Buna" and polyvinyl ester together into a workable composition.

Following are illustrative examples of the methods and compositions of the present invention.

Example 1.—A. One part each by weight of "Vinylite" ("Vyn w" and of "Buna S" were milled together on a rubber mixing rolls with the temperature at about 210° F. and to these materials was added gradually about one-half part of acetone and the mixing continued until the acetone had brought the "Vinylite" and the "Buna S" into solution together. "Vinylite vyn w" is considered to be a copolymer of ninety-five parts of vinyl chloride and five parts of vinyl acetate.

B. To a batch as set forth in paragraph A above about one-fifth (⅕) part by weight of sulphur was milled in and a piece of the mix was cured in a pressure mold at about 150° C. for about fifteen minutes.

C. To a batch as set forth in paragraph A above the following ingredients in the given proportions were milled in and the batch cured as set forth below: zinc oxide, 0.07 part; "Aminox," 0.04 part; "Tuads," 0.06 part; and "Gastex," 0.09 part. These ingredients were milled in with a batch as described in paragraph A above and a piece was cured in a pressure mold at about 150° C. for fifteen (15) minutes.

*Example I.*—A. Ten parts by weight of pure gum turpentine, about fifteen parts of a commercial formaldehyde solution (about 37½% in water), and about one part by weight of concentrated sulphuric acid were heated together under a reflux condenser to refluxing temperature for about eight hours from which was obtained about thirteen and one-half parts of a water insoluble liquid reaction product having a specific gravity of 1.03.

B. The water insoluble liquid reaction product of IA, in the previous paragraph, was heated to 230° C. to obtain a loss of 25% by evaporation leaving a residue which is a product slightly more viscous than the liquid reaction product of IA.

*Example II.*—A. About sixty-four parts by weight of a commercial solution of formaldehyde in water (about 37.5% solution), twenty-four parts of tertiary amyl alcohol and about two-tenths of one part of concentrated sulphuric acid (specific gravity about 1.8) were placed in an autoclave and heated until a pressure of about one hundred pounds was reached at which point it was kept for about one hour, after which the pressure was released by opening a valve for the purpose of blowing off unreacted reagents and products of reaction which are volatile at this temperature (about 150° C.).

The sulphuric acid, used as a catalyser or condensing agent, was neutralized with sodium hydroxide solution, the reaction mass was heated in an open pan in an oven at about 150° C. to dehydrate it, after which the sodium sulphate was filtered off. The reaction product now remaining is called herein product IIA and comprises, generally, a water soluble fraction which is about two-thirds of product IIA by weight and a water insoluble fraction which is about one-third of product IIA and these two fractions can be separated by fractional distillation at a reduced pressure, for example, at from about 20 to about 30 millimeters of mercury.

B. Product IIA, described above, was chlorinated by blowing anhydrous chlorine gas through it until it had gained five per cent of its own original weight in chlorine combined therewith. This chlorination product is designated herein as product IIB.

*Example 2.*—The artificial rubber compositions corresponding to those in Example 1 (A, B and C) were made up with the difference that methyl isobutyl ketone was substituted for the acetone of Example 1, and in similar quantity.

*Example 3.*—By weight, ten parts of "Vinylite vyn w" were dissolved in forty parts of product IA, described above, by heating them together at about 150° C., after which were added fifty parts of "Buna S," three and one-half parts of zinc oxide, two parts of "Aminox," three parts of "Tuads," and forty-five parts of "Gastex," these ingredients being mixed on rubber mixing rolls. This composition after mixing can be cured in a mold at about 150° C.

*Example 4.*—A composition similar to that of Example 3 was made with the difference that product IB was substituted for product IA and in the same quantity by weight. This gave a drier or less tacky "rubber" than the composition of Example 3.

*Example 5.*—A composition similar to that of Example 3 was made with the difference that product IIA was substituted for product IA and in the same amount by weight.

*Example 6.*—A composition similar to that of Example 3 was made with the difference that product IIB was substituted for product IA and in similar amount. This gave a drier or less tacky "rubber" than the composition of Example 3.

*Example 7.*—By weight, eighty parts of "Perbunan," twenty-five parts of "Vinylite-vyn w," fifty parts of either of product IA, IB, IIA or IIB, five parts of zinc oxide, one part of stearic acid, two parts of sulphur, forty-five parts of "P-33," ten parts of "Speedon," one and two-tenths parts of "Altax" and three-tenths part of dibutyl amine are mixed together. This composition can be cured for example for thirty minutes at about 140° C.

*General example.*—In each of Examples 3 to 6, inclusive, the quantity of "Vinylite-vyn w" can be increased to fifteen parts and of the product IA (IB, IIA or IIB) can be decreased to thirty-five parts.

The following trade-mark names or trade names are identified as follows: "Gastex" and "P-33" are carbon blacks; "Speedon," "Altax" and "Tuads" are vulcanization accelerators; and "Aminox" is an antioxidant.

In the examples above the following can be substituted for all or any part of the "Vinylite-vyn w" wherever that is used: "Qyna" which is polymerized vinyl chloride; "vyn s" which is a copolymer of ninety parts of vinyl chloride and ten parts of vinyl acetate; "vyl f" which is a copolymer of eighty-seven parts of vinyl chloride and thirteen parts of vinyl acetate; "xyfg" which is a polyvinyl butyral, formed by treating polyvinyl alcohol with butyric aldehyde to give an acetal called polyvinyl butyral which is soluble in butyl alcohol and having a high tensile strength.

An advantage of the compositions of the present invention is that they have a greatly improved tear strength or resistance as compared with similar compositions made of "Buna" type artificial rubber without the polyvinyl esters.

In addition to illustrating the method of bringing artificial rubber of the "Buna" type into solution or compatibility with polyvinyl esters, these examples also illustrate the use of these solutions of "Buna" type artificial rubber with polyvinyl esters in "rubber" mixtures or compositions suitable for molding by heat and pressure or suitable for sheeting in calender or sheeting rolls and for general use to which rubber compositions can be placed.

Having thus described my invention, what I claim and desire to protect by Letters Patent is:

1. The method of making a rubber-like composition of matter capable of vulcanization with sulfur to a product having high tear strength which comprises blending together a polymerized butadiene synthetic rubber, a polyvinyl ester selected from the group consisting of polyvinyl chloride, polyvinyl acetate, and co-polymers of vinyl chloride and vinyl acetate, and a mutual solvent comprising an organic condensation reaction product of formaldehyde and turpentine under acidic conditions.

2. A millable composition of matter comprising a butadiene rubbery polymer, material selected from the group consisting of polyvinyl chloride, polyvinyl acetate and copolymers of vinyl chloride and vinyl acetate and mutual solvent comprising an organic condensation reaction product of formaldehyde and turpentine under acidic conditions and having a boiling point greater than 230° C.

MORTIMER T. HARVEY.